(12) United States Patent
Yamada

(10) Patent No.: US 10,486,408 B2
(45) Date of Patent: Nov. 26, 2019

(54) FILM APPLICATION METHOD

(71) Applicant: SHARP KABUSHIKI KAISHA, Sakai, Osaka (JP)

(72) Inventor: Nobuaki Yamada, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 87 days.

(21) Appl. No.: 15/579,728

(22) PCT Filed: Jun. 8, 2016

(86) PCT No.: PCT/JP2016/067014
§ 371 (c)(1),
(2) Date: Dec. 5, 2017

(87) PCT Pub. No.: WO2016/204034
PCT Pub. Date: Dec. 22, 2016

(65) Prior Publication Data
US 2018/0178502 A1   Jun. 28, 2018

(30) Foreign Application Priority Data
Jun. 15, 2015  (JP) .................................. 2015-120204

(51) Int. Cl.
*B32B 43/00* (2006.01)
*B32B 38/10* (2006.01)
(Continued)

(52) U.S. Cl.
CPC ............ *B32B 38/10* (2013.01); *A47L 25/005* (2013.01); *B32B 7/12* (2013.01); *B32B 27/06* (2013.01);
(Continued)

(58) Field of Classification Search
CPC . B32B 38/10; B32B 43/006; Y10T 156/1168; Y10T 156/1195; Y10T 156/1994
(Continued)

(56) References Cited

U.S. PATENT DOCUMENTS

| | | | | |
|---|---|---|---|---|
| 5,498,455 A | * | 3/1996 | Roberts ................. | A47G 1/175 40/773 |
| 2009/0186181 A1 | * | 7/2009 | Mase ..................... | B29C 63/02 428/40.1 |

(Continued)

FOREIGN PATENT DOCUMENTS

| | | |
|---|---|---|
| JP | 07-318919 A | 12/1995 |
| JP | 08-050290 A | 2/1996 |

(Continued)

*Primary Examiner* — Mark A Osele
*Assistant Examiner* — Nickolas R Harm
(74) *Attorney, Agent, or Firm* — ScienBiziP, P.C.

(57) ABSTRACT

The present invention provides a film application method that can prevent entry of foreign substances and air bubbles between the film and the application target even when the film is applied in a general environment in which foreign substances such as dust are floating. The film application method is a film application method that applies a functional film to a substrate, the method including the steps of: (1) applying a first adhesive layer to the substrate, with a foreign-substance-removing unit including the first adhesive layer and a first film being overlaid onto a main unit including a second film, a second adhesive layer, and the functional film; and (2) while peeling off both the foreign-substance-removing unit and the second film, with one end of the functional film fixed to the substrate, by pulling ends of the foreign-substance-removing unit and the second film adjacent to the fixed end of the functional film through between the substrate and the functional film, applying the second adhesive layer exposed by removal of the second
(Continued)

film to the surface of the substrate exposed by removal of the foreign-substance-removing unit.

12 Claims, 9 Drawing Sheets

(51) Int. Cl.
*G02B 1/14* (2015.01)
*A47L 25/00* (2006.01)
*B32B 7/12* (2006.01)
*B32B 27/06* (2006.01)
*B32B 37/12* (2006.01)
*G02B 1/11* (2015.01)
*G02F 1/1335* (2006.01)

(52) U.S. Cl.
CPC ............... *B32B 37/12* (2013.01); *G02B 1/14* (2015.01); *B32B 43/006* (2013.01); *B32B 2551/00* (2013.01); *G02B 1/11* (2013.01); *G02F 1/133528* (2013.01); *G02F 2001/133541* (2013.01); *Y10T 156/1168* (2015.01); *Y10T 156/1195* (2015.01); *Y10T 156/1994* (2015.01)

(58) Field of Classification Search
USPC ........................................ 156/714, 719, 767
See application file for complete search history.

(56) References Cited

U.S. PATENT DOCUMENTS

| | | | | |
|---|---|---|---|---|
| 2012/0057287 | A1* | 3/2012 | Chaves | C09J 7/30 361/679.3 |
| 2012/0076967 | A1* | 3/2012 | Muramatsu | C09J 7/403 428/41.8 |
| 2012/0276318 | A1* | 11/2012 | Franke | B29C 63/0047 428/41.8 |
| 2013/0040088 | A1* | 2/2013 | Hirayama | G02B 27/0006 428/41.7 |
| 2013/0255874 | A1* | 10/2013 | Tapio | B29C 63/02 156/249 |
| 2014/0124146 | A1* | 5/2014 | Patel | B29C 63/0004 156/574 |
| 2014/0230988 | A1* | 8/2014 | Chou | B29C 63/0004 156/60 |
| 2016/0009024 | A1* | 1/2016 | Mason | B29C 63/02 156/249 |
| 2017/0217129 | A1 | 8/2017 | Yamada | |

FOREIGN PATENT DOCUMENTS

| | | |
|---|---|---|
| JP | 08-274058 A | 10/1996 |
| JP | 2006-186026 A | 7/2006 |
| JP | 2010-286664 A | 12/2010 |
| WO | 2015/125811 A1 | 8/2015 |

\* cited by examiner (a)

(b)

(c)

(d)

(a)

(b)

(c)

(a)

(b)

(c)

(d)

(a)

(b)

(c)

(a)

(b)

(c)

(d)

FILM APPLICATION METHOD

TECHNICAL FIELD

The present invention relates to film application methods. The present invention more specifically relates to a film application method suited to cases where users apply a functional film to any of various substrates.

BACKGROUND ART

Mobile display devices such as cellphones and tablet PCs are apt to be damaged when hit or scratched, for example. In order to prevent such damage, the users often manually apply a protective film to the surface of their mobile display device on their own. When the users apply a film to a product on their own, they usually apply a film in a general environment, not in a controlled environment such as a clean room environment or vacuum. In a general environment, however, it is difficult to manually apply a film while sufficiently preventing entry of foreign substances and air bubbles between the product and the film. Also in cases where a film is applied to a large surface such as windows at construction sites or display windows of convenience stores or department stores, the application cannot be conducted in an environment where foreign substances are controlled, such as a clean room environment. It is therefore also difficult to apply a film while preventing entry of foreign substances between such a surface and the film as in the case of application to mobile display devices.

There is a film application method that can be manually performed and prevent entry of foreign substances and air bubbles even in a general environment. The method includes controlling the application position of the film and removing air bubbles using soapy water, and drying the film in the air. This method has advantages such as a fine control of the application position, and is used by professionals of film application when they apply to a glass window a film on which a company logo or an advertisement is printed. However, this method is inconvenient for general users because soapy water is required and air-drying takes time, for example. Also, the method can still be improved from the viewpoint of preventing entry of foreign substances, though the method can sufficiently remove air bubbles.

Meanwhile, mainly for cases of applying a film to a product in a factory, there are various known treatment methods and devices for preventing entry of foreign substances and air bubbles between the film and the product. Common methods here include, for example, application methods performed in a clean room or in vacuum (e.g. Patent Literature 1). For example, for application of a film to a liquid crystal panel, a large-scale cleaning system is used.

Patent Literature 2 discloses a method including supplying a liquid whose temperature is higher than the room temperature to remove foreign substances, dirt and grime on the surface of the liquid crystal panel. Patent Literature 3 discloses an application apparatus configured to automatically clean the surface of the main unit of the liquid crystal panel with its foreign-substance-cleaning roller before applying a polarizer to the surface.

Other known methods are those removing foreign substances by making the foreign substances stick to an adhesive layer. Patent Literature 4 discloses a foreign-substance-removing adhesive tape whose adhesive layer surface picks up foreign substances on the surface of a product such as a semiconductor wafer or a glass substrate to remove the foreign substances. Patent Literature 5 discloses a foreign-substance-removing sheet designed to be applied to a conveyer member when used, wherein the separator for protection of the surface of the foreign-substance-removing layer is applied to the foreign-substance-removing layer by an adhesive layer.

CITATION LIST

Patent Literature

Patent Literature 1: JP H07-318919 A
Patent Literature 2: JP 2010-286664 A
Patent Literature 3: JP H08-50290 A
Patent Literature 4: JP H08-274058 A
Patent Literature 5: JP 2006-186026 A

SUMMARY OF INVENTION

Technical Problem

As described above, the conventional film application methods that can prevent entry of foreign substances and air bubbles have not been easy to use for general users and have not achieved sufficient effects. For example, in the method applying a film using soapy water, the surface to which a film is to be applied and the adhesive surface of the film are both exposed to the general environment before the film is applied. This state unfortunately lets foreign substances stick to the surfaces. Hence, the method applying a film using soapy water can be improved such that entry of foreign substances is more sufficiently prevented.

Also, the technique of Patent Literature 1 utilizes a vacuum chamber. The technique of Patent Literature 2 utilizes a liquid whose temperature is higher than room temperature. The technique of Patent Literature 3 is designed to be used when the process is automatically performed by an application apparatus. Patent Literatures 4 and 5 each merely disclose removal of foreign substances by a foreign-substance-removing adhesive tape or sheet, and fail to disclose a method for applying a film to a product while preventing entry of foreign substances and air bubbles after removing the foreign-substance-removing adhesive tape or sheet.

Hereinafter, before the principle of the present invention is described, a conventional method for applying an optical film is described with reference to drawings to describe why foreign substances and air bubbles enter between a substrate and the optical film in the general environment.

FIG. 9 shows schematic cross-sectional views illustrating a conventional method for applying an optical film. FIG. 9(a) shows the state of a substrate 100 before an optical film 217 is applied. In a general environment, which is not a controlled environment such as a clean room environment or vacuum, many fine foreign substances 200 such as dust are floating. Hence, the foreign substances 200 stick to the surface of the substrate 100. Even when the surface of the substrate 100 is cleaned before application of the optical film 217, it is difficult to prevent the foreign substances 200 from sticking again to the surface of the substrate 100 in the general environment if the application is not performed immediately after completion of the cleaning. The above-described patent literatures showing the method for removing foreign substances by a foreign-substance-removing adhesive tape or sheet fail to disclose any measure to take for such a problem.

FIG. 9(b) shows a conventional process for positional alignment of the optical film 217 before application. As shown in FIG. 9(b), a separator film 211 is arranged on the bottom surface of the conventional optical film 217 with an adhesive layer 216 in between.

As shown in FIG. 9(c), the separator film 211 is peeled off to expose the adhesive layer 216. Since the surface of the adhesive layer 216 exhibits adhesion, the foreign substances 200 floating in the air are likely to stick to the surface.

As shown in FIG. 9(d), the adhesive layer 216 is brought into close contact with the surface of the substrate 100 by an application roller 241, so that the optical film 217 is applied to the substrate 100. If the foreign substances 200 stick to the surface of the substrate 100 or the adhesive layer 216, the foreign substances 200 are included between the substrate 100 and the optical film 217 upon the application. Also, air bubbles can be included between the substrate 100 and the optical film 217. In the case where the substrate 100 is a screen of a display device, the portions including air bubbles may appear as white spots and the portions including foreign substances may function as lenses, causing the display device to provide inappropriate display. Accordingly, a method for applying an optical film has been desired which can prevent entry of foreign substances and air bubbles even in the general environment.

The present invention has been made in view of the above current state of the art, and aims to provide a method for applying a film that can be easy to use for the general users and can prevent entry of foreign substances and air bubbles between the film and the application target even when the film is manually applied in the general environment where foreign substances such as dust are floating.

Solution to Problem

The inventor has made various studies on film application methods that do not require any special environmental control or special equipment for application, and that can prevent entry of foreign substances and air bubbles even when the film is manually applied in a general environment. As a result, the inventor has found that in the general environment, many foreign substances such as dust are floating in the air and, even when foreign substances on the substrate, which is the target of functional film application, are once removed, foreign substances stick again to the substrate and the adhesive surface of the functional film until immediately before application of the functional film. The inventor has then intensively studied a method for applying a functional film to the substrate surface while protecting the substrate surface and the adhesive surface of the functional film, after peeling off an adhesive layer applied to the substrate surface for cleaning. Thereby, the inventor has arrived at a novel film application method, accomplishing the present invention.

That is, one aspect of the present invention may be a film application method that applies a functional film to a substrate, the method including the steps of: (1) applying a first adhesive layer to the substrate, with a foreign-substance-removing unit including the first adhesive layer and a first film being overlaid onto a main unit including a second film, a second adhesive layer, and the functional film; and (2) while peeling off both the foreign-substance-removing unit and the second film, with one end of the functional film fixed to the substrate, by pulling ends of the foreign-substance-removing unit and the second film adjacent to the fixed end of the functional film through between the substrate and the functional film, applying the second adhesive layer exposed by removal of the second film to the surface of the substrate exposed by removal of the foreign-substance-removing unit.

Advantageous Effects of Invention

The film application method of the present invention can sufficiently prevent entry of foreign substances and air bubbles in the interface between the film and the application target by removing foreign substances such as dust on a substrate, if present, immediately before application of a functional film, and immediately applying the functional film with the exposed surface protected. Also, since the method requires no special environmental control or equipment for application and requires no liquid unlike the conventional method utilizing soapy water, the method is easy to use for the general users.

BRIEF DESCRIPTION OF DRAWINGS

FIG. 6(a) shows the state of being connected to the film, and FIG. 6(b) shows the state upon pulling.

DESCRIPTION OF EMBODIMENTS

Definition of Terms

Each "film" herein is not limited by its thickness, and may be what is called a "sheet".

The adhesive power of an adhesive layer depends on the application target and measurement method. Herein, in the case of evaluating the adhesive power of an adhesive layer, a substrate made of alkali-free glass is used as the application target regardless of the actual application target, and an adhesive power value determined by the following measurement method is used. However, in the case of evaluating the adhesive power of an adhesive layer for a surface on which an easy-peel treatment has been performed, a substrate made of alkali-free glass on which the same easy-peel treatment has been performed is used. Here, the absolute value of the adhesive power depends on the application target, but the magnitude relation of the adhesive power tends not to change.

(Method for Measuring Adhesive Power)

To a substrate horizontally fixed is applied a strip-like film having a width of 25 mm and including an adhesive layer. At this time, one end of the film is left unattached to the substrate. The one end of the film being left unattached to the substrate is held between clamps of a tensile tester (peel test jig), so that a 90° peel test (rate of pulling: 0.3 m/min) is performed.

Hereinafter, embodiments of the present invention are described with reference to the drawings. The present invention, however, is not limited to the following embodiments. Also, the configurations in the embodiments may appropriately be combined or modified within the spirit of the present invention. In the embodiments, members exerting the same function are provided with the same reference sign.

Embodiment 1

Figure 1:
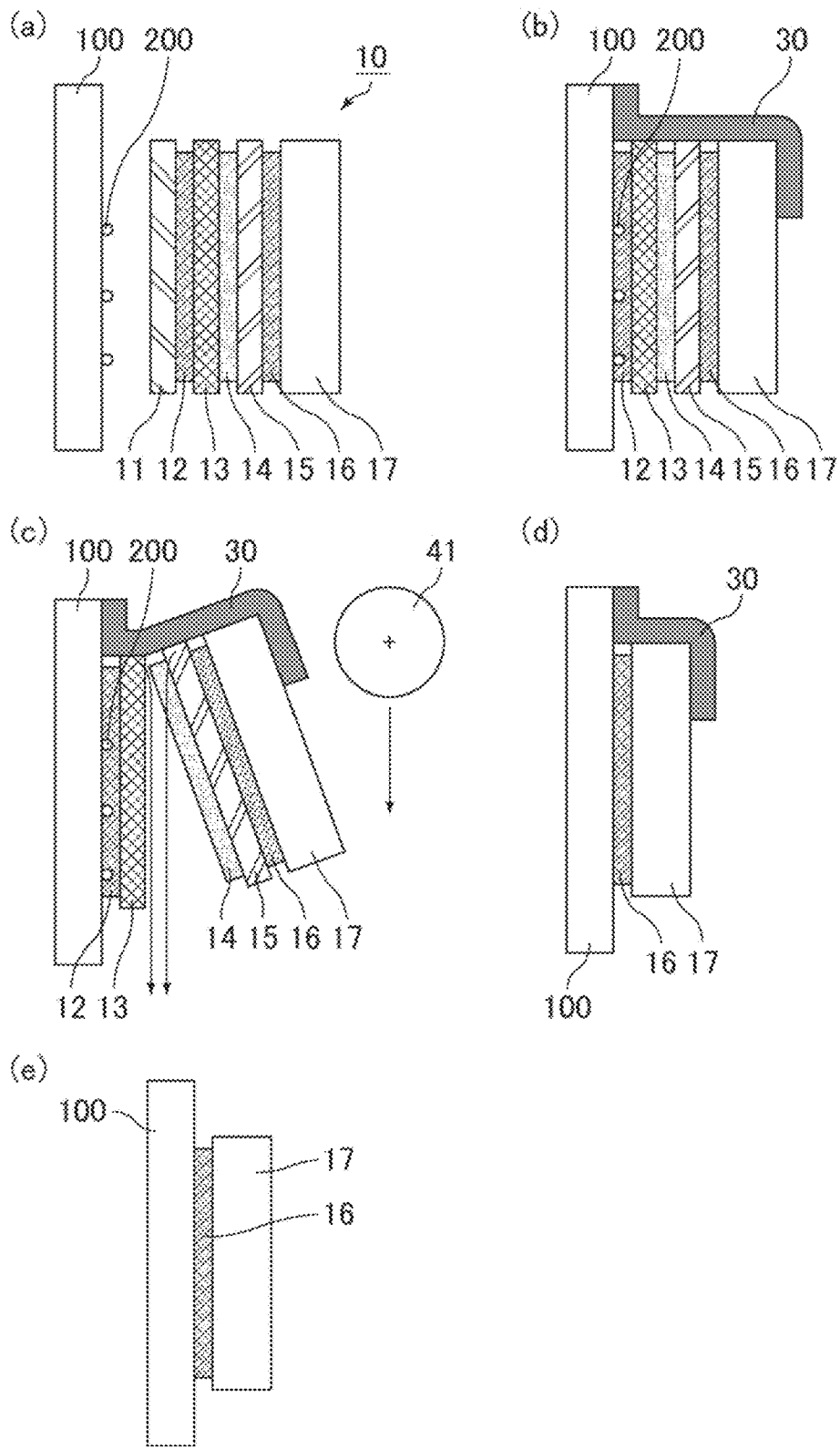
FIG. 1 shows schematic views illustrating a film application method of Embodiment 1.

FIG. 1 shows schematic views illustrating a film application method of Embodiment 1. Embodiment 1 employs a laminated film 10 in which an optical film 17 to be applied to a surface of a substrate 100 and a foreign-substance-removing film 13 used to remove the foreign substances 200 on the substrate 100 are combined by a combining adhesive layer 14. The laminated film 10 includes, in the given order, a first separator film 11, a foreign-substance-removing adhesive layer (first adhesive layer) 12, the foreign-substance-removing film (first film) 13, the combining adhesive layer 14, a second separator film (second film) 15, a substrate-application adhesive layer (second adhesive layer) 16, and the optical film (functional film) 17. Hereinafter, the laminate including the first separator film 11, the foreign-substance-removing adhesive layer 12, and the foreign-substance-removing film 13 in the given order is also referred to as a foreign-substance-removing unit. The laminate including the second separator film 15, the substrate-application adhesive layer 16, and the optical film 17 in the given order is also referred to as a main unit. In the process of application to the substrate 100, the optical film 17 comes to the top of the laminated film 10.

The first separator film 11 is configured to protect the surface of the foreign-substance-removing adhesive layer 12 before use. The separator film 11 is not particularly limited, and may be, for example, a general film such as a polyethylene terephthalate (PET) film, a polyethylene naphthalate (PEN) film, an acrylic film, or a cycloolefin polymer (COP) film.

The foreign-substance-removing adhesive layer 12 is configured to pick up the foreign substances 200 present on the surface of the substrate 100 being the application target, and preferably has significantly lower adhesive power than the substrate-application adhesive layer 16. Materials suitable for the foreign-substance-removing adhesive layer 12 are adhesive materials classified to have weak adhesive power. Specific examples thereof include PF-AN422, PF-AN474 (both from Lintec Corporation), and ZBO-0421 (from Fujimori Kogyo Co., Ltd.). The adhesive power of the foreign-substance-removing adhesive layer 12 is preferably 0.05 to 1 N/25 mm width. An adhesive power value of lower than 0.05 N/25 mm width is likely to cause the adherend to peel off, which results in poor workability. An adhesive power value of higher than 1 N/25 mm width may be higher than the adhesive power values of the combining adhesive layer 14 and the substrate-application adhesive layer 16, and may not allow easy peeling of the first separator film 11.

The foreign-substance-removing film 13 is configured to support the foreign-substance-removing adhesive layer 12. The foreign-substance-removing adhesive layer 12 and the foreign-substance-removing film 13 are collectively handled, and application and peeling of the foreign-substance-removing film 13 mean application and peeling of the foreign-substance-removing adhesive layer 12 at the same time. The foreign-substance-removing film 13 is not particularly limited, and may be, for example, a general film such as a polyethylene terephthalate (PET) film, a polyethylene naphthalate (PEN) film, an acrylic film, or a cycloolefin polymer (COP) film. The foreign-substance-removing film 13 may be colored. If colored, the foreign-substance-removing film 13 can be easily identified, and is therefore prevented from being confused with other films and mistakenly peeled off in the application process. Also, since the foreign-substance-removing film 13 is to be eventually removed from the substrate 100, there is no disadvantage of coloring.

The combining adhesive layer 14 has a function of combining the foreign-substance-removing film 13 and the optical film 17 in the laminated film 10, and preferably has significantly lower adhesive power than the substrate-application adhesive layer 16. Materials suitable for the combining adhesive layer 14 are adhesive materials classified to have weak adhesive power. Specific examples thereof include PF-AN422, PF-AN474 (both from Lintec Corporation), and ZBO-0421 (from Fujimori Kogyo Co., Ltd.). The adhesive power of the combining adhesive layer 14 is preferably 0.05 to 1 N/25 mm width. An adhesive power value of lower than 0.05 N/25 mm width is likely to cause the adherend to peel off, which results in poor workability. An adhesive power value of higher than 1 N/25 mm width may be higher than the adhesive power value of the substrate-application adhesive layer 16, and may not allow easy peeling of the foreign-substance-removing film 13.

The second separator film 15 is configured to protect the surface of the substrate-application adhesive layer 16 before use. The second separator film 15 can minimize the chance for the surface of the substrate-application adhesive layer 16 used for application to the substrate 100 to be exposed to the atmosphere in which the foreign substances 200 are present. The second separator film 15 is not particularly limited, and may be, for example, a general film such as a polyethylene terephthalate (PET) film, a polyethylene naphthalate (PEN) film, an acrylic film, or a cycloolefin polymer (COP) film. The second separator film 15 may be colored. If colored, the second separator film 15 can be easily identified, and is therefore prevented from being confused with other films and mistakenly peeled off in the application process. Also, since the second separator film 15 is to be eventually removed from the substrate 100, there is no disadvantage of coloring. In the case of coloring both the foreign-substance-removing film 13 and the second separator film 15, they are preferably colored in different colors.

The substrate-application adhesive layer 16 is an adhesive layer used to apply the optical film 17 to the substrate 100. The substrate-application adhesive layer 16 and the optical film 17 are collectively handled, and application and peeling of the optical film 17 mean application and peeling of the substrate-application adhesive layer 16 at the same time. Materials suitable for the substrate-application adhesive layer 16 are those that firmly stick to the substrate 100. Specific examples thereof include MO3014 (from Fujimori Kogyo Co., Ltd.), MCF-464, and NCF-619 (both from Lintec Corporation). Preferably, the adhesive power of the substrate-application adhesive layer 16 is higher than the adhesive power values of the foreign-substance-removing adhesive layer 12 and the combining adhesive layer 14 and is specifically 1 to 30 N/25 mm width. An adhesive power value of lower than 1 N/25 mm width may be lower than the adhesive power values of the foreign-substance-removing adhesive layer 12 and the combining adhesive layer 14 which are lower layers, resulting in poor workability in a process such as peeling of the first separator film 11. An adhesive power value of higher than 30 N/25 mm width is not likely to allow easy peeling of the adherend, resulting in poor workability.

Also, an easy-peel treatment is performed on the surface of the second separator film 15 facing the substrate-application adhesive layer 16, and thus the substrate-application adhesive layer 16 is more strongly bonded with the optical film 17 than with the second separator film 15.

Nonlimiting examples of the optical film 17 include films having an optical function, such as anti-reflective films, anti-glare films, and retardation films. The structure of the optical film 17 is not particularly limited, and the optical film 17 may have irregularities on the surface or may have a laminated structure. Examples of the structures (protrusions) constituting the irregularities include conical nanostructures. Specific examples of the optical film 17 having irregularities on the surface include moth-eye films having a moth-eye surface structure. Specific examples of the optical film 17 having a laminated structure include DBEF series from Sumitomo 3M Limited. Examples of the material of the optical film 17 include polyethylene terephthalate (PET), polyethylene naphthalate (PEN), acrylic compounds, and cycloolefin polymer (COP).

The laminated film 10 preferably satisfies the following inequality (1) of the adhesive power, for peeling of the films in the order shown in FIG. 1.

$$M<N<L \qquad (1)$$

In the inequality (1), M represents the adhesive power between the first separator film 11 and the foreign-substance-removing adhesive layer 12, N represents the adhesive power between the foreign-substance-removing film 13 and the combining adhesive layer 14, and L represents the adhesive power between the second separator film 15 and the substrate-application adhesive layer 16.

On the optical film 17 without the substrate-application adhesive layer 16 thereon may be laminated an adhesive layer and a surface protective film.

In the case where the region on the substrate 100 to which the optical film 17 is to be applied includes protrusions, the thickness of the entire film to be applied is preferably larger than the height of the protrusions on the substrate 100 for ease of application with a roller. For this purpose, a cushion layer (buffer layer) formed of an elastic material may be formed on the surface of the optical film 17 without the substrate-application adhesive layer 16 thereon. The cushion layer may be removed from the optical film 17 after application. Examples of the substrate 100 having protrusions include a display device including a frame (outer frame) around the display portion. Such a display device includes irregularities at the border between the display portion and the frame, possibly at each of the four sides of a quadrangular display portion. The cushion layer is preferably a flexible one having a hardness with which the layer can maintain its film shape when peeled off. Suitable examples of the material of the cushion layer include foamed products of resin materials. Suitable examples of the resin materials include urethane resins and butadiene resins. The cushion layer can be, for example, urethane foam (trade name: Nippalay, 5-mm thick) from NHK Spring Co., Ltd.

Hereinafter, the film application method is described in detail based on FIG. 1. Although FIG. 1 shows the case where a film is applied to a vertical plane, the concept of the present invention is applicable to any of vertical, horizontal, or oblique planes, flat or curved.

The laminated film 10 and the substrate 100 are first aligned, with the first separator film 11 situated to face the substrate 100. At this time, the laminated film 10 may be fixed to the substrate 100 by applying one end side of the laminated film 10 to the substrate 100 using a temporary fixing member such as a tape 30. In the case where a relatively large foreign substance 200, dirt or grime sticks to the substrate 100, the surface of the substrate 100 may be cleaned before the laminated film 10 is applied to the surface of the substrate 100. In environments other than the environments in which foreign substances 200 are artificially removed such as a clean room environment or vacuum, the foreign substances 200 such as dust are usually floating in the air, and thus the foreign substances 200 stick to the surface of the substrate 100 which is the application target as shown in FIG. 1(a). The substrate 100 may be of any type, and may be a glass plate or a resin film, for example.

The first separator film 11 is then peeled off to expose the foreign-substance-removing adhesive layer 12. In this state, as shown in FIG. 1(b), the laminated film 10 is applied to the substrate 100. Thereby, the foreign-substance-removing adhesive layer 12 and the surface of the substrate 100 are brought into close contact with each other, so that the foreign substances 200 sticking to the surface of the substrate 100 are caught by the foreign-substance-removing adhesive layer 12. In the case where fixation using a temporary fixing member such as the tape 30 has not been performed in the process of alignment, one end side of the laminated film 10 is connected by the tape 30 to the vicinity of the region of the substrate 100 with the laminated film 10 applied thereto, whereby the laminated film 10 is fixed to the substrate 100. The tape 30 is applied to an end of the optical film 17 that is on the top of the laminated film 10 to connect the optical film 17 and the substrate 100. Also, the application is preferably performed by, while peeling off the first separator film 11, consecutively pressing the exposed foreign-substance-removing adhesive layer 12 onto the substrate 100 with a roller. Thereby, the method can prevent entry of air bubbles between the surface of the substrate 100 and the foreign-substance-removing adhesive layer 12, enabling suitable removal of the foreign substances 200 from the entire surface of the substrate 100.

As shown in FIG. 1(c), the second separator film 15 is then pulled in the normal direction of the substrate surface (in the right direction in FIG. 1(c)) to separate the foreign-substance-removing film 13 and the second separator film 15. As a result, the laminated film 10 is open in a V shape. The combining adhesive layer 14 is on the second separator film 15 in FIG. 1(c), but may remain on the foreign-substance-removing film 13. The method for separating the foreign-substance-removing film 13 and the second separator film 15 is not particularly limited, and a needle-like member may be inserted between the foreign-substance-removing film 13 and the second separator film 15 or a gas may be injected between the foreign-substance-removing film 13 and the second separator film 15.

The ends of the foreign-substance-removing film 13 and the second separator film 15 are peeled off from the tape 30. As the ends of the films 13 and 15 adjacent to the tape are pulled out from between the substrate 100 and the optical film 17, the optical film 17 is consecutively pressed onto the substrate 100 by an application roller 41. Thereby, the substrate-application adhesive layer 16 exposed by removal of the second separator film 15 is brought into close contact with the surface of the substrate 100, so that the optical film 17 is applied to the surface of the substrate 100 with the substrate-application adhesive layer 16 in between as shown in FIG. 1(d). The tape 30 is removed, whereby application of the optical film 17 to the substrate 100 is completed as shown in FIG. 1(e).

When the foreign-substance-removing film 13 is peeled off, the foreign substances 200 on the surface of the substrate 100 are removed to expose a clean surface of the substrate 100. Also, when the second separator film 15 is peeled off, the substrate-application adhesive layer 16 is exposed. Immediately after the exposure of the surface of the substrate 100, the substrate-application adhesive layer 16 is brought into close contact with the exposed surface to effectively prevent entry of the foreign substances 200 in the interface between the adhesive layer and the substrate.

In order to pull out the foreign-substance-removing film 13 and the second separator film 15, a stick-like member (pick-up stick) having a connecting member such as an adhesive member (e.g., double-sided tape) or hook may be used. In this case, the foreign-substance-removing film 13 and the second separator film 15 can be peeled off by inserting a pick-up stick between the substrate 100 and the optical film 17, connecting the pick-up stick to the two films 13 and 15, and pulling out the pick-up stick. In Embodiment 3 described below, a pulling jig having a structure suited to pulling out the two films 13 and 15 is described in detail.

In order to continuously apply the optical film 17 while preventing entry of the foreign substances 200 in the interface between the film and the substrate, the foreign-substance-removing film 13 and the second separator film 15 may be peeled off by winding the films 13 and 15 on a winding roller (peel-off roller), and the substrate-application adhesive layer 16 may be brought into close contact with the substrate by pressing the layer with the application roller (pressing roller) 41. In order to continuously apply the optical film 17, the peeling speed (film winding speed) for the foreign-substance-removing film 13 and the second separator film 15 is made the same as or higher than the moving speed (film application speed) for the application roller 41. In order to minimize entry of the foreign substances 200 in the interface between the film and the substrate, the peeling speed for the foreign-substance-removing film 13 and the second separator film 15 is preferably made substantially the same as the moving speed for the application roller.

The angle of the pulling direction for the optical film 17 from the substrate 100 is set to be larger than the angle of the peeling direction for the foreign-substance-removing film 13 and the second separator film 15 from the substrate 100, but is kept small to avoid winding of the optical film 17 on the application roller 41. In the case of applying the film to a horizontal plane, the angle of the pulling direction for the optical film 17 from the substrate surface is preferably smaller than 90° to prevent the foreign substances 200 from entering under the optical film 17 before application.

The foreign-substance-removing film 13, the second separator film 15, and the optical film 17 may each be provided with a lead part for pulling. The lead part extends from the main part of each of the films 13, 15, and 17, and is thinner than the main part. Provision of lead parts allows easy application of uniform tensile force to the films 13, 15, and 17 when they are pulled, which improves the workability and the precision of application of the optical film 17. The lead parts may be parts integrally formed with the respective main parts of the films 13, 15, and 17, or may be tape members (lead tape members) joined with the main parts of the respective films 13, 15, and 17.

The method of the present embodiment peels off the foreign-substance-removing film 13 and applies the optical film 17 while fixing an end of the optical film 17, enabling precise application of the optical film 17 to the region from which the foreign substances 200 are removed. In addition, since the region from which the foreign substances 200 are removed are covered with the optical film 17 immediately after the foreign-substance-removing film 13 is peeled off, sticking of the foreign substances 200 such as dust from the outside before application of the optical film 17 can be prevented. The method can therefore apply the optical film 17 to the substrate 100 while preventing entry of foreign substances 200 and air bubbles in the interface between the film and the substrate even in a general environment in which the foreign substances 200 such as dust are floating. Also, unlike conventional application methods employing soapy water, the method is a dry application method requiring no liquid which can greatly shorten the work time and avoid a mess with the liquid in the workspace.

Embodiment 2

Figure 2:
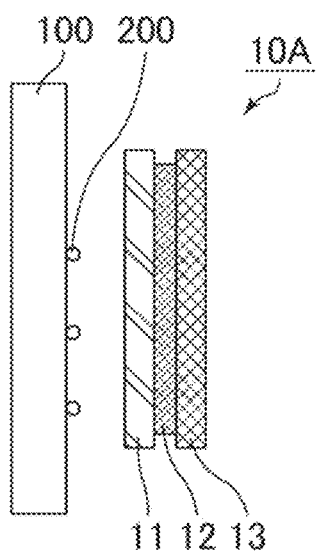
FIG. 2 shows schematic views illustrating a film application method of Embodiment 2.
Figure 2:
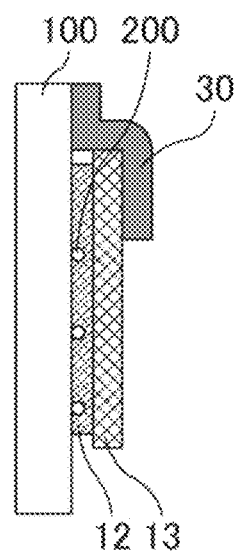
Figure 2:
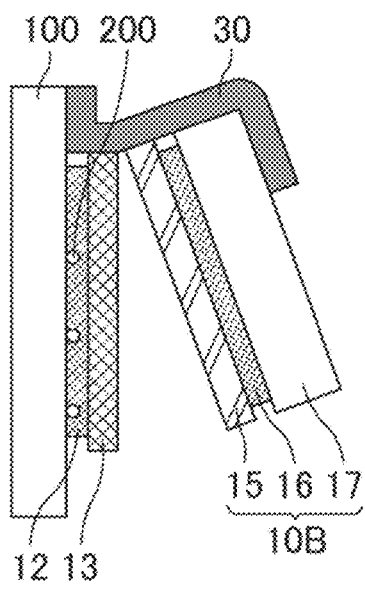
Figure 2:
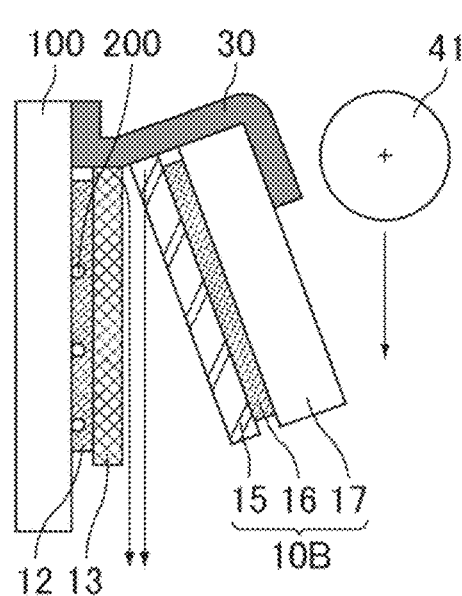

FIG. 2 shows schematic views illustrating a film application method of Embodiment 2. In Embodiment 2, the foreign-substance-removing unit and the main unit are not combined with each other, and are separate films independent of each other. That is, Embodiment 2 employs a first laminated film (foreign-substance-removing unit) 10A in which the first separator film 11, the foreign-substance-removing adhesive layer (first adhesive layer) 12, and the foreign-substance-removing film (first film) 13 are laminated in the given order, and a second laminated film (main unit) 10B in which the second separator film (second film) 15, the substrate-application adhesive layer (second adhesive layer) 16, and the optical film 17 (functional film) are laminated in the given order, without the combining adhesive layer 14. Here, on the surface of the optical film 17 without the substrate-application adhesive layer 16 may be arranged members such as an adhesive layer, a surface protective film, and a cushion layer.

The first laminated film 10A and the second laminated film 10B preferably satisfy the following inequality (2) of the adhesive power, for peeling of the films in the order shown in FIG. 2.

$$M < L \tag{2}$$

In the inequality (2), M represents the adhesive power between the first separator film 11 and the foreign-substance-removing adhesive layer 12, and L represents the adhesive power between the second separator film 15 and the substrate-application adhesive layer 16.

Hereinafter, the film application method is described based on FIG. 2.

The first laminated film 10A and the substrate 100 are first aligned, with the first separator film 11 situated to face the substrate. At this time, the first laminated film 10A is fixed to the substrate 100 by applying one end side of the first laminated film 10A to the substrate 100 using a temporary fixing member such as the tape 30. In the case where a relatively large foreign substance 200, dirt or grime sticks to the substrate 100, the surface of the substrate 100 may be cleaned before the first laminated film 10A is applied to the surface of the substrate 100. In environments other than the environments in which the foreign substances 200 are artificially removed such as a clean room environment or vacuum, the foreign substances 200 such as dust are usually floating in the air, and thus the foreign substances 200 stick to the surface of the substrate 100 which is the application target as shown in FIG. 2(a). The substrate 100 may be of any type, and may be a glass plate or a resin film, for example.

The first separator film 11 is then peeled off to expose the foreign-substance-removing adhesive layer 12. In this state, as shown in FIG. 2(b), the first laminated film 10A is applied to the substrate 100. Thereby, the foreign-substance-removing adhesive layer 12 and the surface of the substrate 100 are brought into close contact with each other, so that the foreign substances 200 sticking to the surface of the substrate 100 are caught by the foreign-substance-removing adhesive layer 12. The tape 30 is removed after application of the first laminated film 10A. Also, the application is preferably performed by, while peeling off the first separator film 11, consecutively pressing the exposed foreign-substance-removing adhesive layer 12 onto the substrate 100 with a roller. Thereby, the method can prevent entry of air bubbles between the surface of the substrate 100 and the foreign-substance-removing adhesive layer 12, enabling suitable removal of the foreign substances 200 from the entire surface of the substrate 100.

As shown in FIG. 2(c), the second laminated film 10B is overlaid on the first laminated film 10A applied to the substrate 100, and one end side of the second laminated film 10B is applied to the substrate 100 using a temporary fixing member such as the tape 30. At this time, the second separator film 15 is situated to face the substrate, and thereby the optical film 17 is connected by the tape 30 to the substrate 100.

Figure 3:
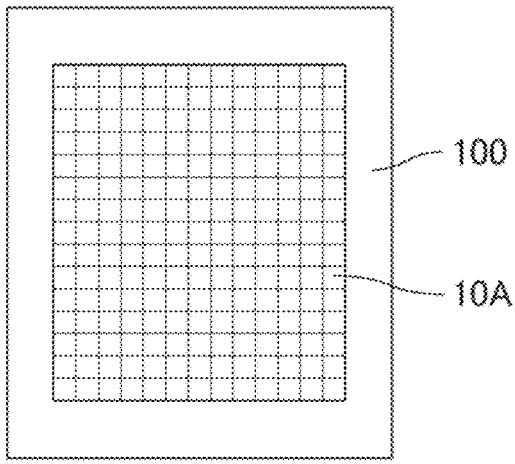
FIG. 3 shows views illustrating exemplary alignment of the first and second laminated films with marks in Embodiment 2.
Figure 3:
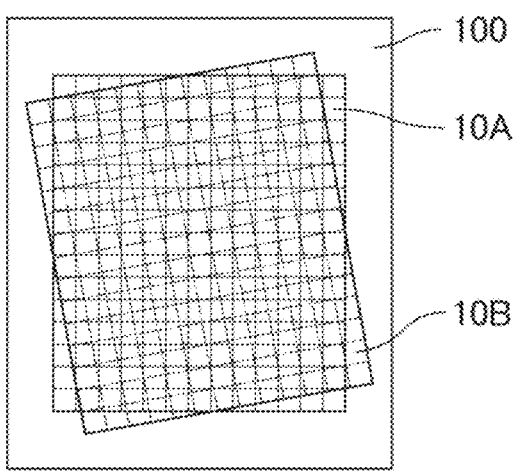
Figure 3:
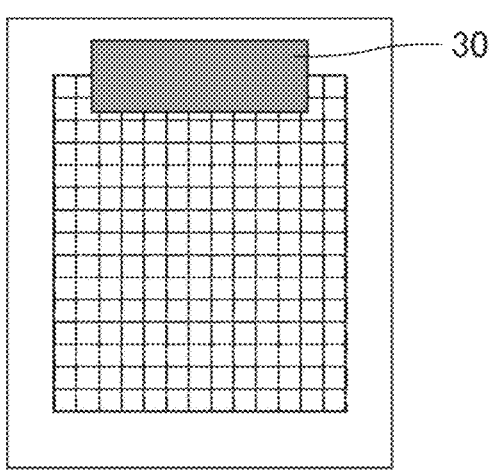

At least one of the first laminated film 10A and the second laminated film 10B may be provided with a mark for alignment. Such a mark facilitates alignment because, particularly in application to a vertical plane, the second laminated film 10B needs to be carefully aligned to avoid dropping of the second laminated film 10B. FIG. 3 shows views illustrating exemplary alignment of the first and second laminated films with marks in Embodiment 2. As shown in FIG. 3(a), a grid pattern is drawn in solid lines as a mark on the first laminated film 10A. Meanwhile, as shown in FIG. 3(b), a grid pattern is drawn in dotted lines as a mark on the second laminated film 10B. FIG. 3(b) shows that the first laminated film 10A and the second laminated film 10B are aligned by matching the grid patterns overlaid onto one another. The tape 30 is then applied to the aligned films to fix the optical film 17 to the substrate 100 as shown in FIG. 3(c). The pattern of the marks may be any pattern that can be used in alignment, such as a dot pattern. Each mark may be provided at any position visible from the direction of the foreign-substance-removing film 13. For example, the mark may be drawn on either one of the surfaces of the foreign-substance-removing film 13.

After the optical film 17 is fixed by the tape 30, as shown in FIG. 2(d), the second separator film 15 is pulled in the normal direction of the substrate surface (in the right direction in FIG. 2(d)) to open the foreign-substance-removing film 13 and the second separator film 15 in a V shape. The ends of the foreign-substance-removing film 13 and the second separator film 15 are peeled off from the tape 30. As these ends of the films 13 and 15 adjacent to the tape are pulled out from between the substrate 100 and the optical film 17, the optical film 17 is consecutively pressed onto the substrate 100 by the application roller 41. Thereby, the substrate-application adhesive layer 16 exposed by removal of the second separator film 15 is brought into close contact with the surface of the substrate 100, so that the optical film 17 is applied to the surface of the substrate 100 with the substrate-application adhesive layer 16 in between as shown in FIG. 1(d). The method of pulling out the two films 13 and 15 is similar to that in Embodiment 1. As in Embodiment 1, the foreign-substance-removing film 13 and the second separator film 15 may be peeled off by winding the films 13 and 15 on a winding roller (peel-off roller), and the substrate-application adhesive layer 16 may be brought into close contact with the substrate by pressing the layer with the application roller (pressing roller) 41. The peeling speed (film winding speed) for the foreign-substance-removing film 13 and the second separator film 15 may be made the same as or higher than the moving speed (film application speed) for the application roller 41, and is preferably adjusted to the same speed. The tape 30 is then removed, whereby application of the optical film 17 to the substrate 100 is completed as in FIG. 1(e).

In Embodiment 2, when the foreign-substance-removing film 13 is peeled off, the foreign substances 200 on the surface of the substrate 100 are removed to expose a clean surface of the substrate 100. Immediately after the exposure of the surface of the substrate 100, the substrate-application adhesive layer 16 is brought into close contact with the exposed surface to prevent entry of the foreign substances 200 in the interface between the adhesive layer and the substrate. The application method of Embodiment 2 can therefore sufficiently prevent entry of the foreign substances 200 and air bubbles into the interface between the film and the substrate as in the application method of Embodiment 1.

Embodiment 3

In Embodiment 3, a pulling jig used to simultaneously pull out the foreign-substance-removing film 13 and the second separator film 15 is described with reference to the drawings.

Figure 4:
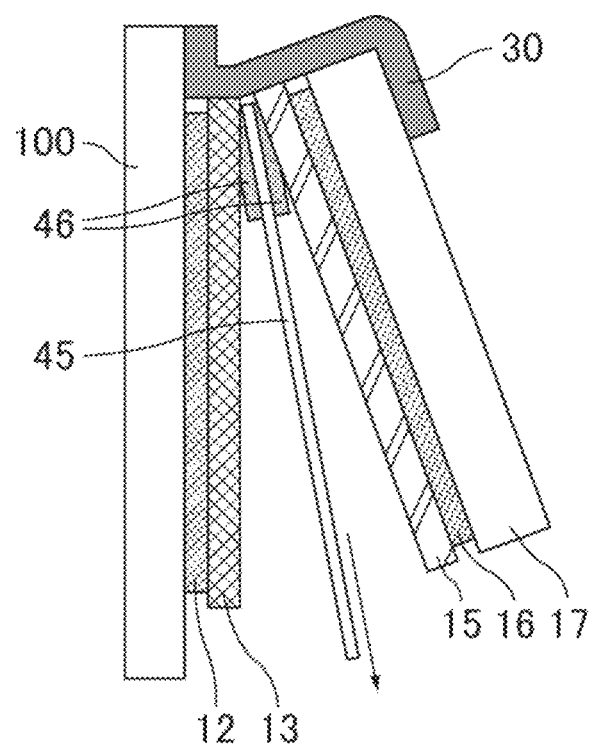
FIG. 4 is a schematic view illustrating an exemplary method for peeling off a foreign-substance-removing film and a second separator film simultaneously.

To clarify the advantages of the pulling jig in Embodiment 3, the case of not using the pulling jig in Embodiment 3 is first described. FIG. 4 is a schematic view illustrating an exemplary method for peeling off a foreign-substance-removing film and a second separator film simultaneously. As shown in FIG. 4, in the case of using a pick-up stick 45 having a double-sided tape 46 at each side of its end, the angle of the pulling direction of the pick-up stick 45 from each of the application surfaces of the foreign-substance-removing film 13 and the second separator film 15 is small, which may make it difficult to peel off the foreign-substance-removing film 13 and the second separator film 15. This is the case where the pulling jig in Embodiment 3 is effective.

Figure 5:
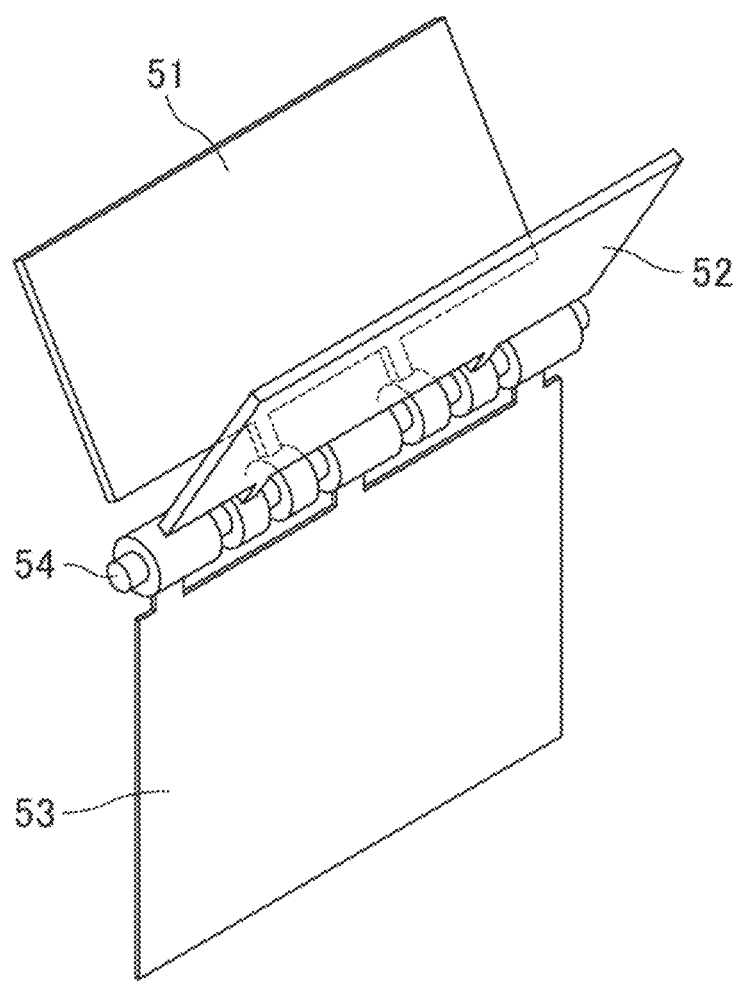
FIG. 5 is a perspective view schematically illustrating a pulling jig in Embodiment 3.

FIG. 5 is a perspective view schematically illustrating a pulling jig in Embodiment 3. As shown in FIG. 5, a pulling jig 50 in Embodiment 3 has a structure in which three axis-rotatable wings are installed to a shaft 54. A first wing (first plate) 51 is to be applied to the foreign-substance-removing film 13 and has an adhesive member 55 such as a double-sided tape on one side. A second wing (second plate) 52 is to be applied to the second separator film 15 and has the adhesive member 55 such as a double-sided tape on one side. A third wing 53 is a member which is used to pull out the two films 13 and 15 after application of the first wing 51 to the foreign-substance-removing film 13 and the second wing 52 to the second separator film 15. Here, the third wing 53 itself may be pulled or another member attached to the third wing 53 may be pulled. The other member may be, without limitation, a windable member such as a lead film, for example, such that peeling and recovery of the foreign-substance-removing film 13 and the second separator film 15 are facilitated.

Figure 6:
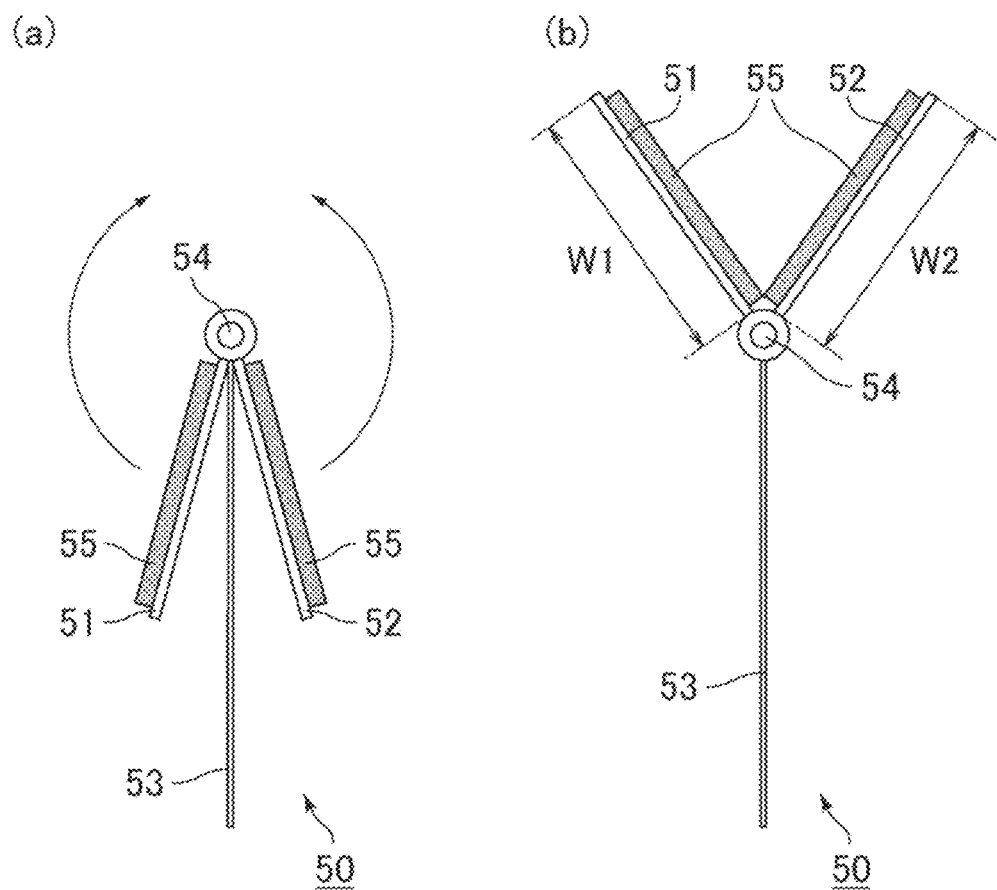
FIG. 6 shows side views schematically illustrating the pulling jig in Embodiment 3.

FIG. 6 shows side views schematically illustrating the pulling jig in Embodiment 3; FIG. 6(a) shows the state of being connected to the film, and FIG. 6(b) shows the state upon pulling. As shown in FIG. 6, the positional relationship among the first to third wings 51, 52, and 53 of the pulling jig 50 in Embodiment 3 is different between application to the films and pulling of the films. That is, in application to the films shown in FIG. 6(a), the surfaces of the first and second wings 51 and 52 with the adhesive members 55 face outward, corresponding to the foreign-substance-removing film 13 and the second separator film 15 open in a V shape. As indicated by the arrows in FIG. 6(a), the first and second wings 51 and 52 rotate about the shaft 54 as a rotating axis in the direction where the surfaces with the adhesive members 55 come to face each other, which is the pulled-out state shown in FIG. 6(b). The films are rotated by moving the shaft 54 downward in FIG. 6(b).

The widths W1 and W2 of the first and second wings 51 and 52 (FIG. 6(b)), respectively, are preferably widths for which the wings do not come into contact with the films when rotated. The specific widths are each preferably 5 to 10 mm, allowing enough space for the adhesive member 55. In order not to inhibit the rotation, the material of the first to third wings 51, 52, and 53 preferably has flexibility and strength that allow the wings to bow (has elasticity to allow flexible bending without breaking) when force is applied to the main surface of the wings. Specific examples thereof include polymer films such as PET films, acrylic films, and cycloolefin films. The first to third wings 51, 52, and 53 may have any thickness, such as a thickness of 50 to 200 μm.

Figure 7:
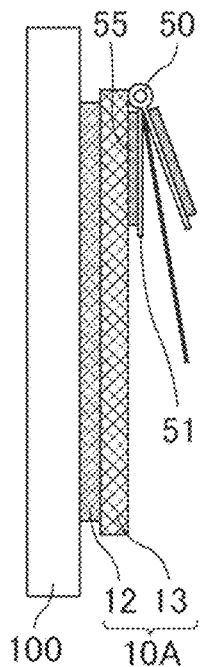
FIG. 7 shows schematic views illustrating an exemplary case where the pulling jig in Embodiment 3 is applied to the film application method of Embodiment 2.
Figure 7:
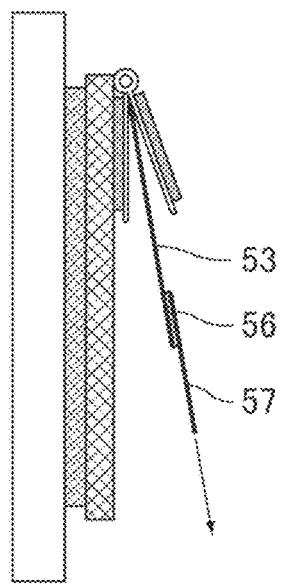
Figure 7:
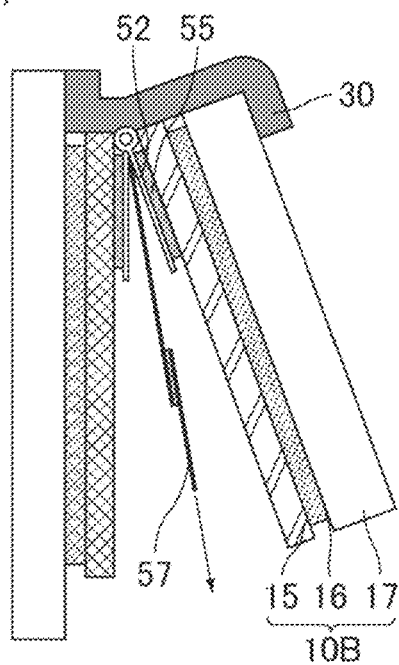
Figure 7:
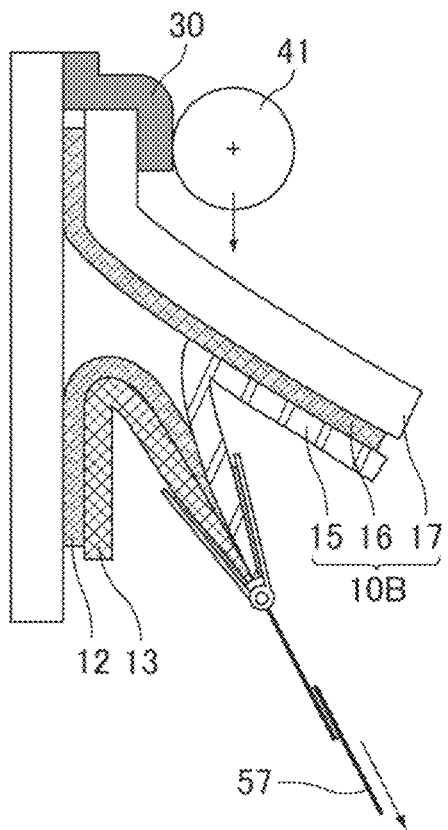

Hereinafter, how to use the pulling jig in Embodiment 3 is described in detail. FIG. 7 shows schematic views illustrating an exemplary case where the pulling jig in Embodiment 3 is applied to the film application method of Embodiment 2.

As shown in FIG. 7(a), the first wing 51 is applied to the first laminated film 10A by bringing the surface of the first wing 51 of the pulling jig with the adhesive member 55 arranged thereon into close contact with the first laminated film 10A applied to the substrate 100 after peeling off the first separator film 11. In the application process, the pulling jig is situated such that the shaft 54 and the surrounding parts, which are thick, do not come into contact with the first laminated film 10A.

Subsequently, as shown in FIG. 7(b), to the third wing 53 of the pulling jig with the first to third wings 51, 52, and 53 overlaid on each other is applied a lead film 57 using a bonding member 56 such as a double-sided tape. The lead film 57 is preferably a flexible, tough film. Suitable examples thereof include a PET film having a thickness of 50 μm or larger. The application end of the lead film 57 may be provided with a rigid member. Increasing the strength of the lead film 57 (generating tensile force in the width direction) with the rigid member can reduce creases formed linearly in the longitudinal direction of the lead film 57 when the lead film is pulled, thereby preventing uneven peeling in the width direction. The application of the lead film 57 may be performed after attachment of the second wing 52 and the second laminated film 10B described below.

As shown in FIG. 7(c), the second separator film 15 of the second laminated film 10B is brought into close contact with the surface of the second wing 52 of the pulling jig 50 with the adhesive member 55 arranged thereon, so that the second wing 52 and the second laminated film 10B are attached to each other. In order to prevent formation of creases on the second laminated film 10B, as shown in FIG. 7(c), one end side of the second laminated film 10B is applied to the substrate 100 using a temporary fixing member such as the tape 30.

After completion of the application to the second laminated film 10B, as shown in FIG. 7(d), the lead film 57 is pulled. Thereby, the first and second wings 51 and 52 are rotated to sandwich the foreign-substance-removing film 13 and the second separator film 15 between them, so that both the foreign-substance-removing film 13 and the second separator film 15 can be peeled off as the pulling jig 50 is pulled out from between the substrate 100 and the optical film 17. Here, as the pulling jig 50 is pulled out, the optical film 17 is consecutively pressed onto the substrate 100 by the application roller 41. This peeling method utilizing the pulling jig 50 enables smooth peeling of both the foreign-substance-removing film 13 and the second separator film 15 by a simple operation, and can prevent entry of the foreign substances 200 and air bubbles in the interface between the substrate 100 and the optical film 17. Here, since the pulling jig 50 is under the maximum stress during transition from the state shown in FIG. 7(c) to the state shown in FIG. 7(d), the angle between the substrate 100 and the optical film 17 is increased as necessary by lifting the optical film 17.

The pulling jig 50 in Embodiment 3 is also applicable to the laminated film 10 in Embodiment 1. Since the foreign-substance-removing film 13 and the optical film 17 are combined in the laminated film 10 in Embodiment 1, the foreign-substance-removing film 13 and the optical film 17 may be separated and then brought into a state similar to the state shown in FIG. 7(c). The first wing 51 and the second wing 52 are applicable without complete separation of the foreign-substance-removing film 13 and the optical film 17. For example, the process may be performed by separating the foreign-substance-removing film 13 and the second separator film 15 at the end of the laminated film 10 applied to the substrate 100, inserting the pulling jig 50 between them to apply the pulling jig 50 to the films, closing the laminated film 10, separating the foreign-substance-removing film 13 and the second separator film 15 at the other end of the laminated film 10, and applying the lead film 57 to the third wing 53 of the pulling jig 50.

Embodiment 4

Figure 8:
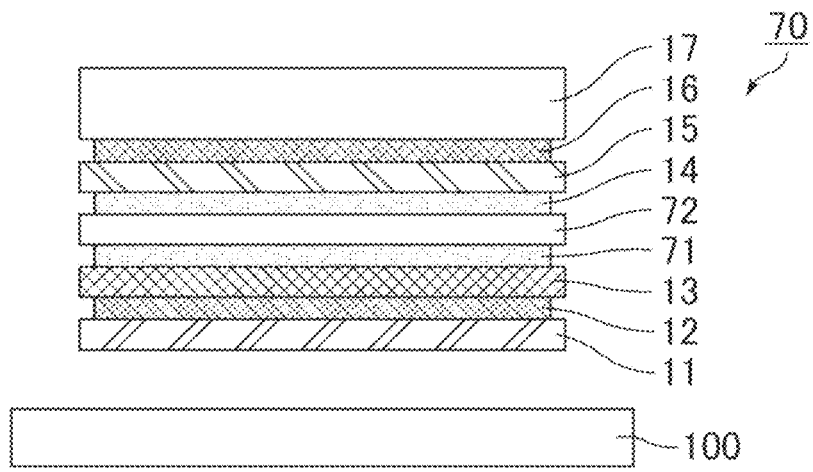
FIG. 8 shows schematic views illustrating a film application method of Embodiment 4.
Figure 8:
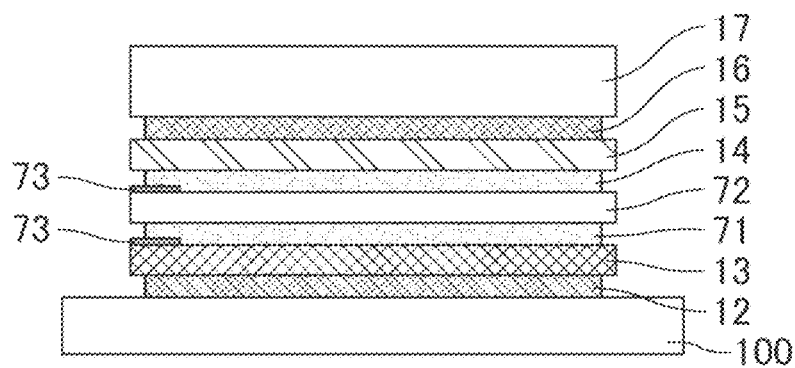
Figure 8:
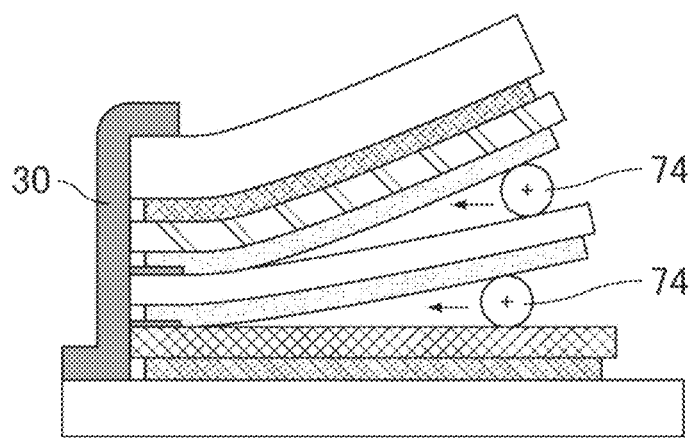
Figure 9:
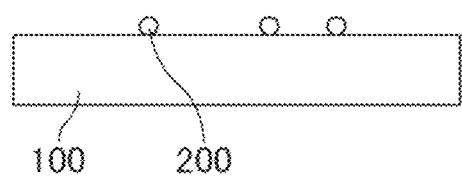
FIG. 9 shows schematic cross-sectional views illustrating a conventional method for applying an optical film.
Figure 9:
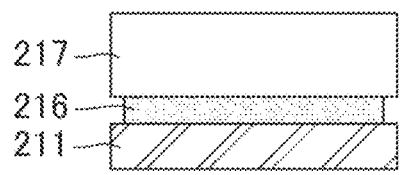
Figure 9:
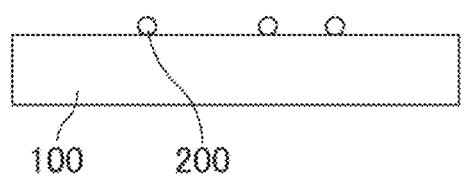
Figure 9:
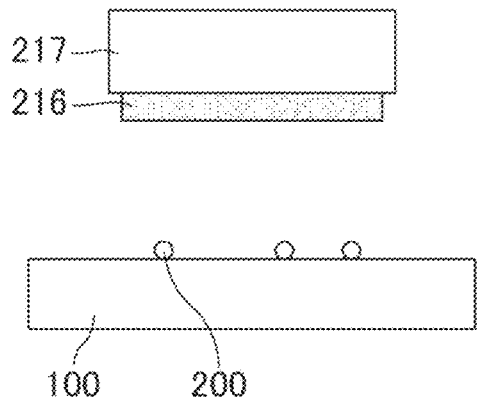
Figure 9:
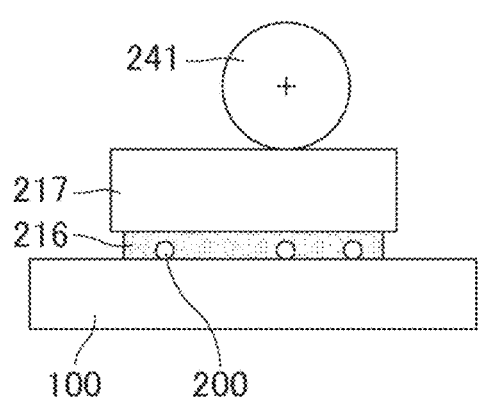

FIG. 8 shows schematic views illustrating a film application method of Embodiment 4. Embodiment 4 employs a laminated film including the foreign-substance-removing film 13 and the second separator film 15 combined with each other with a lead film previously included in between. In other words, a laminated film 70 in Embodiment 4 has a configuration in which, as shown in FIG. 8(a), the first separator film 11, the foreign-substance-removing adhesive layer (first adhesive layer) 12, the foreign-substance-removing film (first film) 13, a lead-film-fixing adhesive layer 71, a lead film (pulling film) 72, the combining adhesive layer 14, the second separator film (second film) 15, the substrate-application adhesive layer (second adhesive layer) 16, and the optical film 17 (functional film) are laminated in the given order. Here, on the surface of the optical film 17 without the substrate-application adhesive layer 16 may be arranged members such as an adhesive layer, a surface protective film, and a cushion layer.

The laminated film 70 preferably satisfies the following inequality (3) of the adhesive power, for peeling of the films in the order shown in FIG. 8.

$$M<(P,Q)<L \qquad (3)$$

In the inequality (3), M represents the adhesive power between the first separator film 11 and the foreign-substance-removing adhesive layer 12, P represents the adhesive power between the foreign-substance-removing film 13 and the lead-film-fixing adhesive layer 71, Q represents the adhesive power between the combining adhesive layer 14 and the second separator film 15, L represents the adhesive power between the second separator film 15 and the substrate-application adhesive layer 16, and (P, Q) represents P and Q each being greater than M but smaller than L without limitation on the magnitude relation between P and Q.

Embodiment 4 allows omission of the operation of applying a lead film. Embodiment 4 also enables more effective prevention of entry of foreign substances by applying the optical film 17 to the substrate 100 while maintaining a small angle of the optical film 17 from the substrate 100. The method of Embodiment 4 is therefore especially effective in consecutively applying a horizontally long optical film 17 in the horizontal direction where entry of foreign substances from the above is a problem.

In the film application method of Embodiment 4, as shown in FIG. 8(b), a bonding member 73 such as a double-sided tape is inserted between the foreign-substance-removing film 13 and the lead film 72 and between the lead film 72 and the second separator film 15 at an end of the laminated film 70 such that the foreign-substance-removing film 13, the lead film 72, and the second separator film 15 are combined. Thereby, the lead film 72 is more strongly bonded with the foreign-substance-removing film 13 and the second separator film 15 at one end than at the other end. The bonding member 73 may be previously included in the laminated film 70.

In addition, as shown in FIG. 8(c), after one end side of the laminated film 70 bonded by the bonding member 73 is fixed to the substrate 100 using a temporary fixing member such as the tape 30, a separation jig 74 such as a film separation rod is inserted between the foreign-substance-removing film 13 and the lead film 72 and between the lead film 72 and the second separator film 15 at the end not bonded by the bonding member 73 (at the right in FIG. 8(c)). The separation jig 74 is then slowly moved toward the other end bonded by the bonding member 73 (in the left direction in FIG. 8(c)) to separate the foreign-substance-removing film 13 and the lead film 72 and separate the lead film 72 and the second separator film 15. Here, by applying back tension to the lead film 72 and the second separator film 15, the separated films facing each other can be effectively prevented from adhering to each other again.

The lead film 72 is then pulled out from between the substrate 100 and the optical film 17, whereby the foreign-substance-removing film 13 and the second separator film 15 can be removed and the optical film 17 can be applied to the substrate 100 as in Embodiments 1 and 2. Here, by moving the film separation rod toward the right in FIG. 8(c) in application of the optical film 17 as the application roller 41 is moved, the separated films facing each other can be effectively prevented from adhering to each other again. The film separation rod may be put away to the right in FIG. 8(c) before the application of the optical film 17.

In the above embodiments, the functional film used was an optical film, but the functional film may be of any type in the present invention. Examples of the functional film include optical films and protective films to be applied to the surface (front plate) of display devices such as cellphones, and protective films and decorative films used for building materials or display cases.

Examples of the optical films suitable in the present invention include the following films (1) to (6). The following films (1) to (6) may be combined with each other.

(1) Anti-Reflection Film

Examples of the anti-reflection film include films having a moth-eye structure, and films formed by laminating low-refractive thin-films. A film having a moth-eye structure includes protrusions arranged at a pitch and a height of 100 nm to hundreds of nanometers, and exhibits a function of preventing interface reflection by continuously changing the refractive index at the interface with the air layer.

(2) Circular Polarizer

A circular polarizer arranged on the surface of a liquid crystal panel can prevent light, which has entered the liquid crystal panel from the outside and then reflected inside the liquid crystal panel, from being emitted to the outside. That is, reflection of the external light by the display screen can be prevented. This is because the polarization state of the polarized light reflected inside the liquid crystal panel is 90° circulated by a change in the phase difference of $\lambda/2$, and is blocked by the circular polarizer. A combination of the circular polarizer with the anti-reflection film (1) can reduce both the surface reflection and the internal reflection, and is effective in improving the display quality.

(3) Anti-Fouling, Scratch-Resistance Improving Film

Examples of the film include those on which a water/oil repellent film is formed. Examples of the water/oil repellent film include films obtained by applying a solubilized fluoropolymer and drying the fluoropolymer; films of a siloxane-based material obtained by chemically bonding molecules with fluorine-based side chains to the surface of a substrate by reactive groups; and films having a low surface tension obtained by polymerizing fluorine-based monomers and oligomers. Examples of the commercially available products thereof include CYTOP (from Asahi Glass Co., Ltd.) which is a soluble fluoropolymer, and Fluoro Surf (from Fluoro-Technology Co., Ltd.) which is a fluoro compound mold release agent.

(4) SAM Film

This is a wide-viewing-angle film that diffuses straight-advancing light to all directions by the fine wedge-shaped slope structure.

(5) Film Touchscreen (6) Film for which Clean Room Cannot be Used

Optical films for building materials (e.g., shatterproof films, heat-ray cutting films, anti-fouling films, anti-glare (AG) films, damage resistant films, anti-fogging films) are usually washed with water and applied with water, but entry of foreign substances is not avoidable, and use of water requires additional work for covering at site. The film application method of the present invention eliminates use of water, and can sufficiently prevent entry of foreign substances even outside a clean room.

[Additional Remarks]

One aspect of the present invention may be a film application method that applies a functional film to a substrate, the method including the steps of: (1) applying a first adhesive layer to the substrate, with a foreign-substance-removing unit including the first adhesive layer and a first film being overlaid onto a main unit including a second film, a second adhesive layer, and the functional film; and (2) while peeling off both the foreign-substance-removing unit and the second film, with one end of the functional film fixed to the substrate, by pulling ends of the foreign-substance-removing unit and the second film adjacent to the fixed end of the functional film through between the substrate and the functional film, applying the second adhesive layer exposed by removal of the second film to the surface of the substrate exposed by removal of the foreign-substance-removing unit.

In the above step (1), the foreign-substance-removing unit and the main unit may be combined with each other. In this case, in the step (2), the foreign-substance-removing unit and the main unit may be separated by injection of a gas between the foreign-substance-removing unit and the main unit, and the ends of the foreign-substance-removing unit and the second film adjacent to a temporary fixing member may be pulled out.

The step (1) may include overlaying the main unit separated from the foreign-substance-removing unit onto the foreign-substance-removing unit applied to the substrate. In this case, at least one of the foreign-substance-removing unit and the second film may be provided with a mark for alignment of the foreign-substance-removing unit and the main unit.

In the step (2), the method may utilize a pulling jig that includes a first plate, a second plate, and a shaft about which the first plate and the second plate are rotatable, and both the foreign-substance-removing unit and the second film may be peeled off by arranging the pulling jig between the foreign-substance-removing unit and the main unit, applying the first plate to the foreign-substance-removing unit and the second plate to the main unit, and pulling out the pulling jig while rotating the first plate and the second plate.

In the step (1), the main unit and the foreign-substance-removing unit may be bonded by a pulling film, the pulling film may be more strongly bonded with the main unit and the foreign-substance-removing unit at a first end than at a second end, and in the step (2), the second end of the pulling film may be separated from the foreign-substance-removing unit and the main unit and pulled out through between the substrate and the functional film, such that the foreign-substance-removing unit and the second film that are bonded with the first end of the pulling film are pulled out together with the pulling film.

In the step (2), a peel-off roller may be rotated to wind at least one of the foreign-substance-removing unit, the second film, and the pulling film around the roller. In this case, in the step (2), a pressing roller may be rotated to apply the functional film to the substrate.

REFERENCE SIGNS LIST

10: Laminated film
10A: First laminated film
10B: Second laminated film
11: First separator film
12: Foreign-substance-removing adhesive layer
13: Foreign-substance-removing film
14: Combining adhesive layer
15: Second separator film
16: Substrate-application adhesive layer
17: Optical film
30: Tape
41, 241: Application roller
45: Pick-up stick
46: Double-sided tape
50: Pulling jig
51: First wing
52: Second wing
53: Third wing
54: Shaft
55: Adhesive member
56: Bonding member
57: Lead film 71: Lead-film-fixing adhesive layer
72: Lead film
73: Bonding member
74: Separation jig
100: Substrate
200: Foreign substance
211: Separator film
216: Adhesive layer
217: Optical film

The invention claimed is:

1. A film application method that applies a functional film to a substrate, the method comprising the steps of:
   (1) applying a first adhesive layer to the substrate, with a foreign-substance-removing unit including the first adhesive layer and a first film being overlaid onto a main unit including a second film, a second adhesive layer, and the functional film; and
   (2) while peeling off both the foreign-substance-removing unit and the second film, with one end of the functional film fixed to the substrate, by pulling ends of the foreign-substance-removing unit and the second film adjacent to the fixed end of the functional film through between the substrate and the functional film, applying the second adhesive layer exposed by removal of the second film to the surface of the substrate exposed by removal of the foreign-substance-removing unit,
   wherein in the step (1), the foreign-substance-removing unit and the main unit are combined with each other, and
   wherein in the step (2), the foreign-substance-removing unit and the main unit are separated by injection of a gas between the foreign-substance-removing unit and the main unit, and the ends of the foreign-substance-removing unit and the second film adjacent to a temporary fixing member are pulled out.

2. The film application method according to claim 1, wherein in the step (2), a pressing roller is rotated to apply the functional film to the substrate.

3. A film application method that applies a functional film to a substrate, the method comprising the steps of:
   (1) applying a first adhesive layer to the substrate, with a foreign-substance-removing unit including the first adhesive layer and a first film being overlaid onto a main unit including a second film, a second adhesive layer, and the functional film; and
   (2) while peeling off both the foreign-substance-removing unit and the second film, with one end of the functional film fixed to the substrate, by pulling ends of the foreign-substance-removing unit and the second film adjacent to the fixed end of the functional film through between the substrate and the functional film, applying the second adhesive layer exposed by removal of the second film to the surface of the substrate exposed by removal of the foreign-substance-removing unit,
   wherein in the step (2), the method utilizes a pulling jig that includes a first plate, a second plate, and a shaft about which the first plate and the second plate are rotatable, and
   both the foreign-substance-removing unit and the second film are peeled off by arranging the pulling jig between the foreign-substance-removing unit and the main unit, applying the first plate to the foreign-substance-removing unit and the second plate to the main unit, and pulling out the pulling jig while rotating the first plate and the second plate.

4. The film application method according to claim 3,
wherein the step (1) includes overlaying the main unit separated from the foreign-substance-removing unit onto the foreign-substance-removing unit applied to the substrate.

5. The film application method according to claim 4, wherein at least one of the foreign-substance-removing unit and the second film is provided with a mark for alignment of the foreign-substance-removing unit and the main unit.

6. The film application method according to claim 3, wherein in the step (2), a pressing roller is rotated to apply the functional film to the substrate.

7. A film application method that applies a functional film to a substrate, the method comprising the steps of:
   (1) applying a first adhesive layer to the substrate, with a foreign-substance-removing unit including the first adhesive layer and a first film being overlaid onto a main unit including a second film, a second adhesive layer, and the functional film; and
   (2) while peeling off both the foreign-substance-removing unit and the second film, with one end of the functional film fixed to the substrate, by pulling ends of the foreign-substance-removing unit and the second film adjacent to the fixed end of the functional film through between the substrate and the functional film, applying the second adhesive layer exposed by removal of the second film to the surface of the substrate exposed by removal of the foreign-substance-removing unit,
   wherein in the step (1), the foreign-substance-removing unit and the main unit are combined with each other, and
   wherein in the step (1), the main unit and the foreign-substance-removing unit are bonded by a pulling film,
   the pulling film is more strongly bonded with the main unit and the foreign-substance-removing unit at a first end than at a second end, and
   in the step (2), the second end of the pulling film is separated from the foreign-substance-removing unit and the main unit and pulled out through between the substrate and the functional film, such that the foreign-substance-removing unit and the second film that are bonded with the first end of the pulling film are pulled out together with the pulling film.

8. The film application method according to claim 7, wherein in the step (2), a pressing roller is rotated to apply the functional film to the substrate.

9. A film application method that applies a functional film to a substrate, the method comprising the steps of:
   (1) applying a first adhesive layer to the substrate, with a foreign-substance-removing unit including the first adhesive layer and a first film being overlaid onto a main unit including a second film, a second adhesive layer, and the functional film; and
   (2) while peeling off both the foreign-substance-removing unit and the second film, with one end of the functional film fixed to the substrate, by pulling ends of the foreign-substance-removing unit and the second film adjacent to the fixed end of the functional film through between the substrate and the functional film, applying the second adhesive layer exposed by removal of the second film to the surface of the substrate exposed by removal of the foreign-substance-removing unit,
   wherein in the step (2), a peel-off roller is rotated to wind at least one of the foreign-substance-removing unit, the second film, and the pulling film around the roller.

10. The film application method according to claim 9, wherein in the step (2), a pressing roller is rotated to apply the functional film to the substrate.

11. The film application method according to claim 9, wherein the step (1) includes overlaying the main unit separated from the foreign-substance-removing unit onto the foreign-substance-removing unit applied to the substrate.

12. The film application method according to claim 11, wherein at least one of the foreign-substance-removing unit and the second film is provided with a mark for alignment of the foreign-substance-removing unit and the main unit.

* * * * *